United States Patent [19]

Nolte

[11] 4,182,178

[45] Jan. 8, 1980

[54] METHOD AND APPARATUS FOR MEASURING A CHANGE IN SURFACE LEVEL OF A LIQUID

[75] Inventor: David G. Nolte, Houston, Tex.

[73] Assignee: Texaco Inc., White Plains, N.Y.

[21] Appl. No.: 925,135

[22] Filed: Jul. 17, 1978

Related U.S. Application Data

[63] Continuation-in-part of Ser. No. 840,932, Oct. 11, 1977, abandoned, which is a continuation of Ser. No. 713,087, Aug. 9, 1976, abandoned.

[51] Int. Cl.² ............................................. G01F 23/14
[52] U.S. Cl. .................................................... 73/299
[58] Field of Search ................. 73/299, 300, 747, 756

[56] References Cited

U.S. PATENT DOCUMENTS

| | | | |
|---|---|---|---|
| 2,068,135 | 1/1937 | Howse | 73/299 |
| 2,870,635 | 1/1959 | Vollbrecht et al. | 73/299 |
| 4,116,076 | 9/1978 | Nolte | 73/299 |

*Primary Examiner*—Donald O. Woodiel
*Attorney, Agent, or Firm*—Robert A. Kulason; Carl G. Ries; Henry C. Dearborn

[57] ABSTRACT

A sensitive J-tube employs an indicating liquid in the U-tube portion for use with an immiscible liquid thereabove. The longer leg of the J-tube has a larger cross-section area portion containing the immiscible liquid when the J-tube has been immersed therein. The arrangement is such that the J-tube will amplify any changes in surface level of the liquid into which it is immersed, by producing a differential between levels of the indicating liquid in the U-tube legs.

The principles are applied to a U-tube instrument to act as a manometer for measuring gas pressure differentials.

11 Claims, 7 Drawing Figures

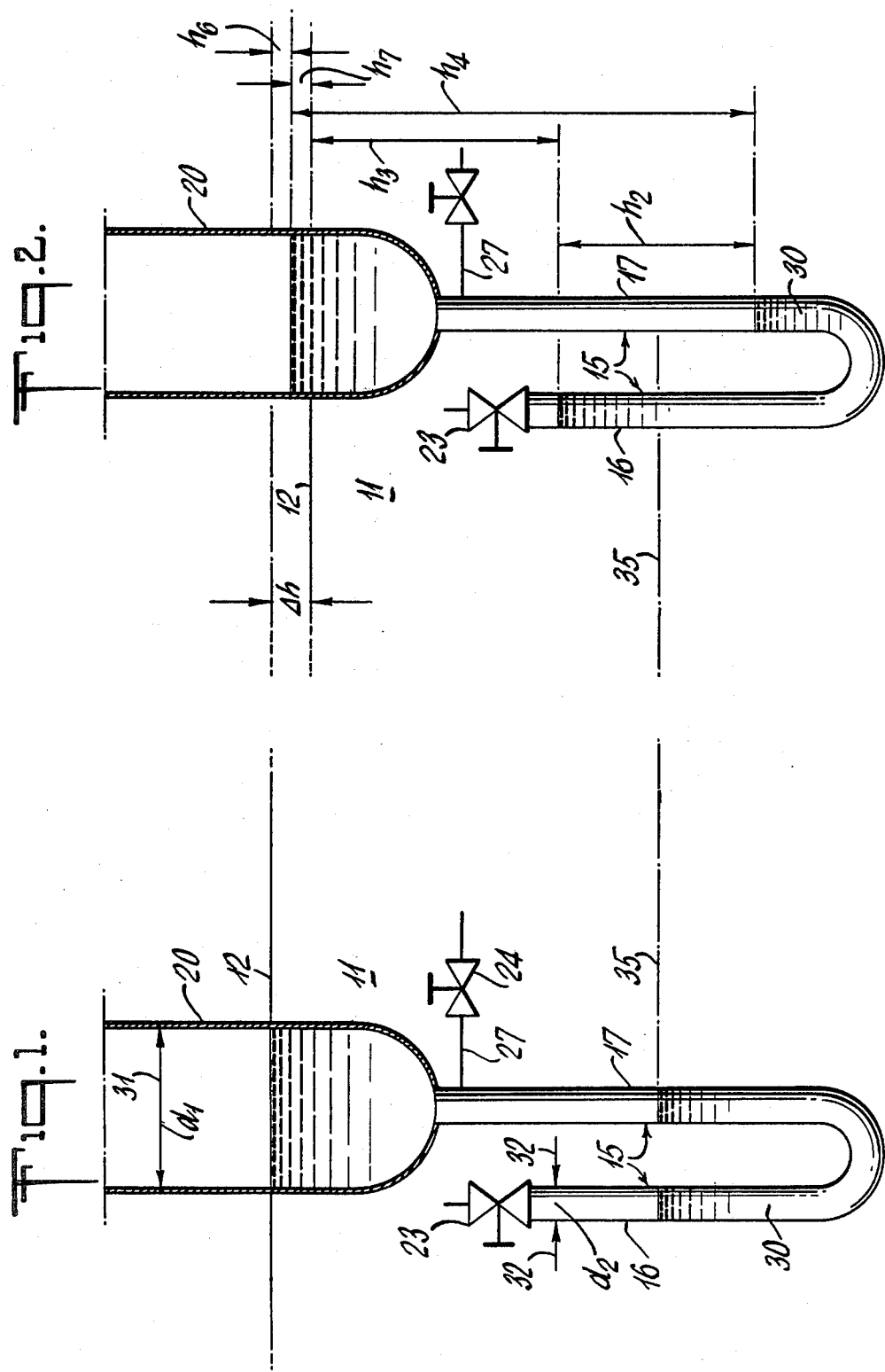

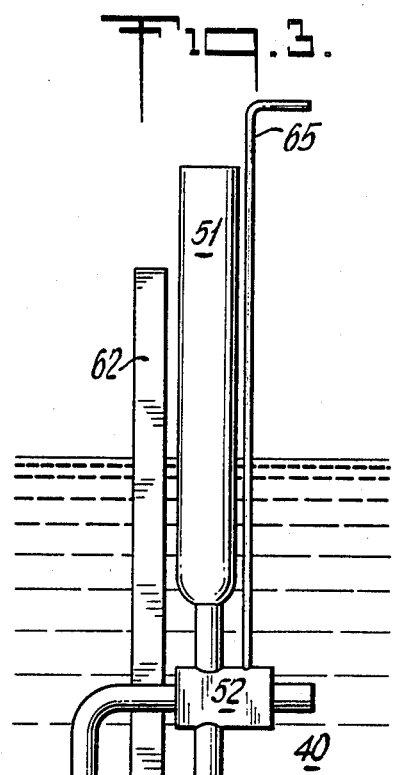
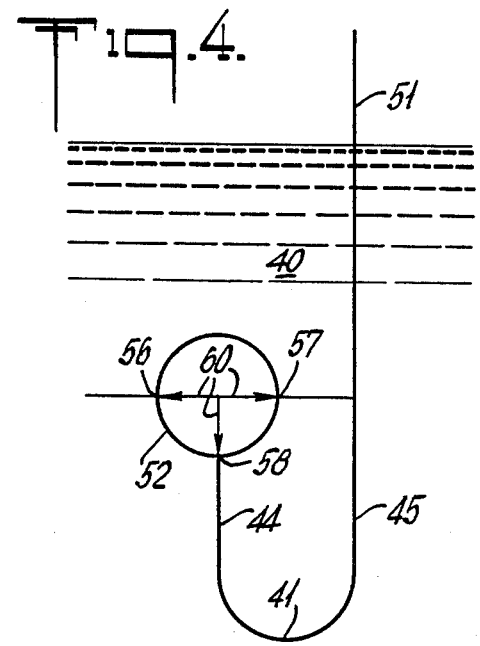
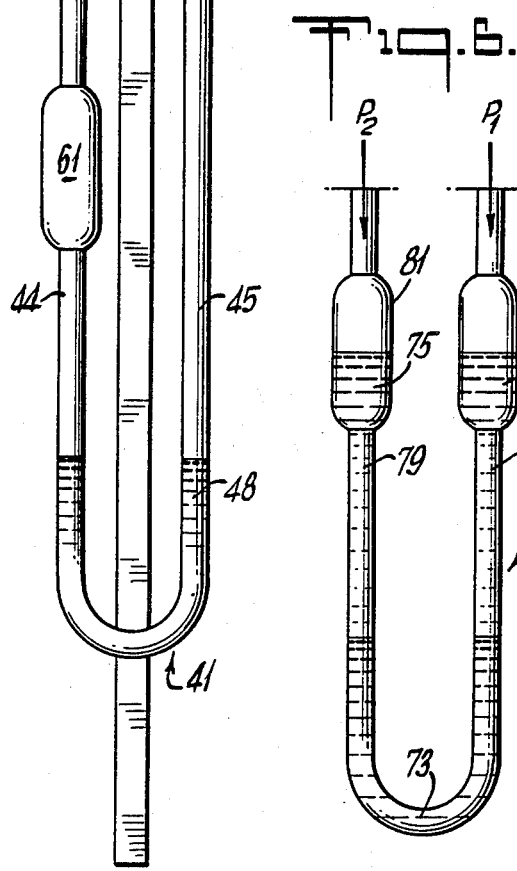
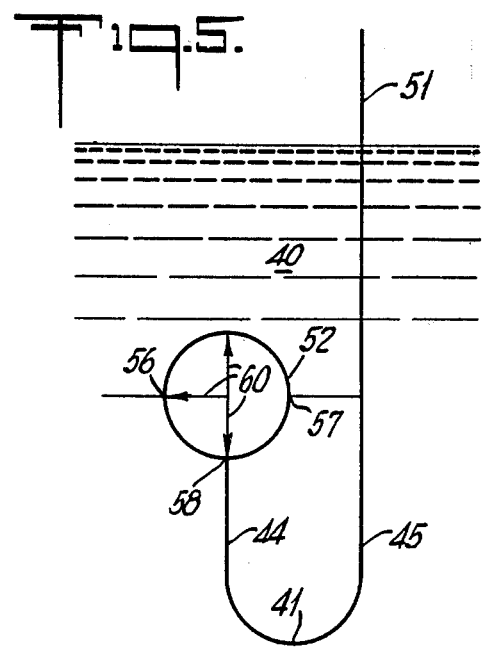

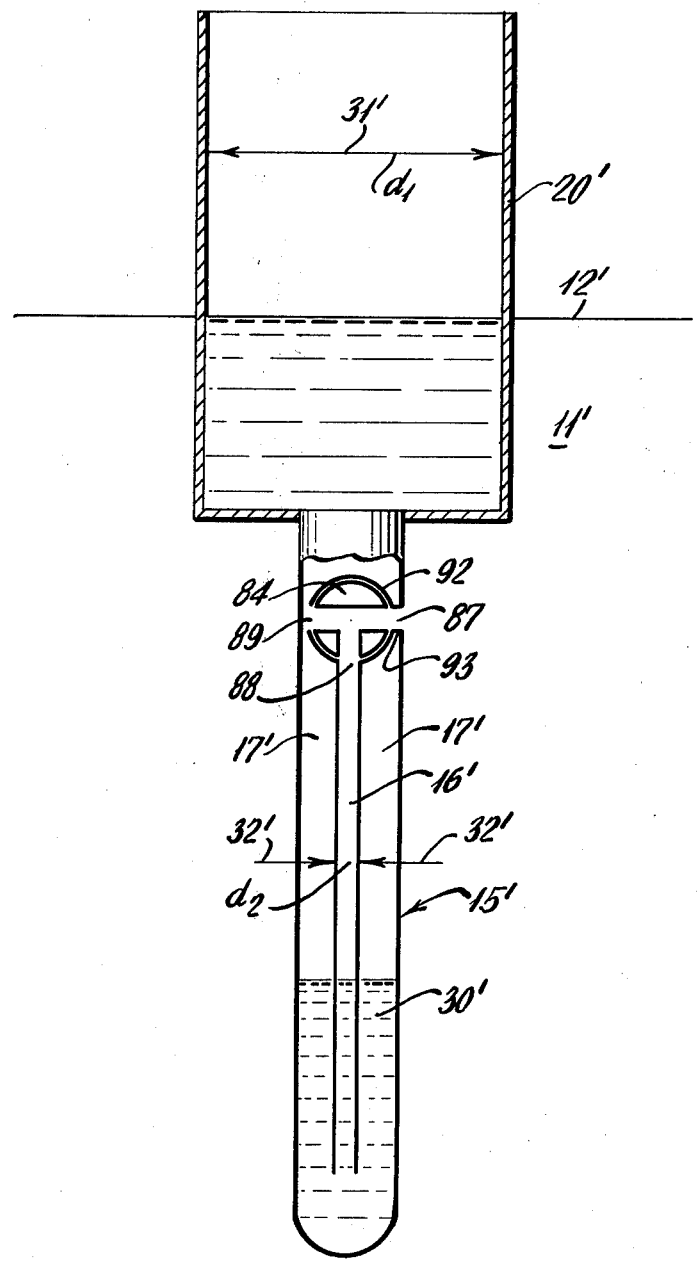

METHOD AND APPARATUS FOR MEASURING A CHANGE IN SURFACE LEVEL OF A LIQUID

CROSS REFERENCE TO RELATED APPLICATIONS

This is a continuation in part of application Ser. No. 840,932 filed Oct. 11, 1977, now abandoned, which was a continuation (37CFR1.60) of application Ser. No. 713,087 filed Aug. 9, 1976, now abandoned, all by the same inventor.

BACKGROUND OF THE INVENTION

1. Field of the Invention

This invention concerns a sensitive J-tube instrument and a particular application thereof. More specifically it concerns an application of the principles involved to provide a novel manometer that has increased sensitivity. Also, a particular application is that of measuring the change in liquid level of a tank of liquid over a predetermined period of time, which change may indicate the presence of a leak.

2. Description of the Prior Art

The testing of underground tanks for leakage has always been a difficult problem. Heretofore, two known methods which have been used have had various drawbacks. A first method required the product to be removed from the tank and the vent lines to be sealed. Then the tank was pressurized with air to several pounds per square inch. The pressure would then be monitored over a given period of time for indications of a leak. Obvious drawbacks of that arrangement included the fact that changes in pressure indicated would not necessarily mean that the tank was leaking but it might just as well be in the connecting lines or dispensor from the tank. Furthermore, the removal of products from the tank was time consuming and costly, and the pressurizing of the tank risked damage thereto.

A second procedure which has been employed involved the fitting of the fill pipe of the tank with a four or five foot high standpipe, and then the tank would be filled with product to the top of the standpipe. Any leakage would then be detected by observing the drop in level of the standpipe. This method had a bad tendency to stress the tank and could expand the ends of the tank. Also, since product had to be added to the tank for this test the temperature would not be stable, and consequently considerable variations would have to be taken into consideration to make an accurate determination.

Consequently, it is an object of this invention to provide an instrument and/or method for determining leaks in large product tanks, such as underground storage tanks for gasoline or the like. It involves the principles of this invention which provides an amplification of the difference in surface levels of a pair of liquid columns that are connected by a U-tube.

SUMMARY OF THE INVENTION

Briefly, the invention concerns a sensitive J-tube device for measuring change in the surface level of a fluid. It comprises a relatively small inside diameter U-tube containing a predetermined quantity of a colored indicator-fluid that is immiscible with said fluid the surface level of which is to be measured. The said indicator-fluid has a density which is approximately the same but heavier than said fluid being measured. The combination comprises a relatively large inside diameter tube connected to one leg of said U-tube and forming therewith the taller leg of said J-tube. The said large tube is long enough to extend from above the maximum surface level of said fluid being measured to below the minimum surface level thereof. It also comprises a three-way valve having three ports for connection to each of the legs of said U-tube and to the body of said fluid being measured, and it comprises means for connecting said U-tube leg ports to said U-tube at a location that is above the maximum height of said indicator-fluid therein. The said three-way valve having at least three positions one for connecting all three of said ports together and one for connecting only the shorter leg of said J-tube to the body of said fluid being measured and one for closing said U-tube leg ports. It also comprises a reservoir connected into the shorter leg of said J-tube at a location above the maximum expected height of said indicator fluid, in order to contain any overflow without loss of indicator fluid. And it comprises an elongated support for holding said J-tube device in a fixed position when a measurement is being taken. It also comprises an elongated handle for actuating said three-way valve from a location above the surface of said fluid being measured.

Again briefly, the invention concerns a method of magnifying the measurements of a change in surface level of a first fluid by employing a U-tube containing a second fluid which is immiscible with said first fluid. The method comprises the steps of connecting a relatively large cross-section area tube to one leg of said U-tube at a location that is higher than a predetermined maximum level of rise of said second fluid in one of the legs of said U-tube. It also comprises the steps of connecting both legs of said U-tube into communication with said first fluid at a location above said maximum level prior to the commencement of a measurement time period, and immersing said U-tube and said large area tube in said first fluid to equalize the level of said first fluid inside of said large area tube with that outside, and equalize the levels of said second fluid in said U-tube legs. It also comprises isolating said one leg and the large cross-section area tube from said first fluid at said commencement of said measurement time period, and determining the difference in fluid levels of said second fluid in said U-tube legs at the termination of said measurement time period.

Once more briefly, the invention concerns a sensitive manometer which comprises a U-tube having a predetermined inside cross-sectional area, and an indicator-liquid in said U-tube. The said indicator liquid has a predetermined density and includes means for determining the height thereof in the legs of said U-tube. The sensitive manometer also comprises a pair of extensions connected to the tops of the legs of said U-tube, the said extensions have inside cross-sectional areas greater than said U-tube cross-sectional area. It also comprises a second liquid immiscible with said indicator-liquid to prevent any mixing therebetween. The said second liquid fills said U-tube legs above said indicator liquid and at least part of said extensions. All of the elements cooperate whereby a difference in pressure applied to the surfaces of said second liquid in said extensions will produce an amplified difference in the height of said indicator-liquid in said U-tube legs.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein:

FIG. 1 is a schematic diagram illustrating a J-tube structure according to one embodiment of the invention;

FIG. 2 is a schematic diagram like that of FIG. 1 but showing the fluid level modified in accordance with changes in the level of a bulk fluid that is having its surface level change measured;

FIG. 3 is a longitudinal elevation not according to scale, illustrating one embodiment of an instrument in accordance with the invention;

FIGS. 4 and 5 are schematic diagrams illustrating two operative positions of the three-way valve that is employed in the instrument according to FIG. 3;

FIG. 6 is a schematic cross-sectional diagram illustrating a sensitive manometer structure in accordance with the invention; and FIG. 7 is a schematic diagram like FIGS. 1 and 2 but illustrating a concentric form of U-tube structure.

DESCRIPTION OF THE PREFERRED EMBODIMENTS

It has been discovered that a change in the level of a body of liquid may be amplified by employing a J-tube instrument according to this invention. The basic principles are illustrated and will be explained in connection with the schematic showings of FIGS. 1 and 2. Both of these figures illustrate a body of liquid 11 that has a surface 12, which may change in height, as indicated in FIG. 2. A change in the height of the surface 12 of liquid body 11 may be because of a leak in the tank (not shown), or other container for the liquid 11. However, such change would be slow and small in many instances. And, particularly where an underground tank of gasoline or the like is concerned, the change in level is difficult to detect.

It will be noted that the instrument includes a U-tube portion 15, which has a shorter leg 16 connected by the U-shaped bottom with a longer leg 17, on the other side. Connected to the top of the leg 17 of the U-tube, there is a larger cross-sectional area tube 20 that is long enough to extend up above the maximum level of surface 12 of the liquid body 11.

There are two valves 23 and 24 that are connected as indicated, so that the top of leg 16 has valve 23 controlling the opening or closing of the interior of this leg through the top, in regard to connection thereof with the body of fluid 11. The valve 24 is connected so as to similarly control a fluid connection from the inside of the leg 17 of the U-tube 15 to the body of fluid 11. In this case there is a schematic indication of a pipe or other fluid conduit 27 from the upper portion of the U-tube leg 17, to one side of the valve 24. The other side of valve 24 is connected directly into the body of liquid 11, similarily as is the other side of the valve 23, which is connected to the top of the leg 16 of the U-tube 15.

In the U-tube 15 there is an indicator fluid 30, which is immiscible with the liquid 11. As will appear from the explanation which follows, the indicator liquid 30 may be slightly heavier than the liquid 11. However, so long as the immiscibility is maintained, there appears to be no reason why the density of the indicator liquid 30 might not be the same or even less than the density of the liquid 11.

It will be observed that the larger tube 20 has an inside cross-sectional area which is indicated by an arrow across the diameter. It has reference No. 31 applied thereto. This area is greater than the inside cross-sectional area of the legs 16 and 17 of the U-tube. The latter area is indicated by the dimension $d_2$ which has arrows with reference numeral 32 applied thereto (in FIG. 1).

It has been discovered that the changes in the level or height of the surface 12 of the body of liquid 11, will produce a differential in the levels of the indicator liquid 30 in U-tube 15. And, the ratio of the change in level of surface 12, to the differential in the levels of the indicator liquid 30 in the legs 16 and 17, is in accordance with the ratio of the inside cross-sectional area of the legs 16 and 17 to the inside cross-sectional area of the tube 20. Consequently, there is a substantial amplification of the change in the level of the surface 12. Furthermore, with the density of the indicator liquid 30 being the same or close to the same density as the body of liquid 11, the changes in levels are substantially all on account of the ratios of cross-sectional areas. As will appear below, this is because the volume of liquid which must move during the establishment of a new balance, is the major factor in the change in liquid levels.

The foregoing relationship was discovered to exist while employing an indicator liquid that was made of a mixture of water and methanol, and with the body of liquid having its surface level measured being gasoline.

An explanation of why the amplification of liquid level change takes place, may be made clear by reference to the schematic diagrams of FIGS. 1 and 2. Thus, with relation to the various liquid level changes and the sizes of the J-tube structure, consider the following. The procedure involves first the immersion of the J-tube structure, i.e. U-tube 15 and the larger tube 20 connected to leg 17 thereof, all into the body of liquid 11. The immersion is done with valves 23 and 24 both open. Then the liquids in both legs of the J-tube system are permitted to equalize and the surfaces of the indicator liquid 30 will be at the same level. This level is indicated in the diagrams by a dashed line 35.

Next, when it is desired to commence a fluid level measuring time period, the valve 24 will be closed so as to isolate the liquid inside of tube 20 and the connecting leg 17 of the U-tube 15. Thereafter, following some predetermined period of time it may be found that the fluid level 12 of the body of liquid 11 has fallen to the position of the surface 12 which is indicated in FIG. 2. The difference between these levels is indicated by the symbol in FIG. 2.

The change $\Delta h$ in the level of surface 12 will cause a difference in pressure on the indicator-liquid 30 in the two legs of the U-tube 15, because of the fact that the liquids in tube 20 and the leg 17 are isolated from the body of liquid 11. Consequently, the indicator liquid 30 will be pushed down in the leg 17 of the U-tube 15, and a corresponding change must take place in raising the liquid level of the indicator liquid 30 in leg 16. Since the liquid 11 and indicator liquid 30 are immiscible, all of the liquid which was isolated from the body of liquid 11 in the long leg of the J-tube structure remains isolated and there must be an equal volume of the liquid displaced on the leg 16 side of the U-tube as the volume which has moved down from the tube 20 into the leg 17 of the U-tube, as the change in liquid levels took place.

Because of the foregoing conditions, the changes in fluid levels will be directly in proportion to the ratios of the cross-sectional areas of the fluid columns involved or to the square of the diameter of each of the fluid columns.

The foregoing relationship may be proved mathematically in the following manner, with reference to the dimensions indicated on FIGS. 1 and 2, and assuming that the tube 20 and the legs 16 and 17 are circular in cross-section. Thus, it will be observed that:

$$\Delta h = h_6 + h_7 \tag{1}$$

Then, $h_6$ can be obtained in terms of $h_2$ from the fact that the volume of liquid that has left the large diameter tube 20 is equal to the volume of liquid that has entered the small diameter leg 17. The latter is the product of the cross sectional area of leg 17 and the distance $h_2$ divided by two. This may be expressed by the following equations:

$$\pi/4 d_1^2 h_6 = \pi/4 \, d_2^2 h_{2/2} \tag{2}$$

which may be solved for $h_6$ and will result in the equation:

$$h_6 = (d_2/d_1)^2 h_{2/2} \tag{3}$$

Then, $h_7$ can be obtained in terms of $h_2$ from the fact that:

$$h_7 = h_4 - (h_3 + h_2) = (h_4 - h_3) - h_2 \tag{4}$$

It will be noted that the quantity $h_4 - h_3$ can be expressed in terms of $h_2$ as follows, and involving the fluid pressures: the pressure at the depth $h_3$ may be expressed as pressure at $$h_3 = h_3 p_g \tag{5}$$

wherein $p_g$ = the density of the liquid 11.

Then considering the other side (isolated portion) of the U-tube columns, the pressure at depth $h_4$ which is due to the isolated head of liquid 11 above the indicator fluid level in the leg 17 of the U-tube may be expressed as pressure at $$h_4 = h_4 p_g \tag{6}$$

And, since we have a static balance, we can express the difference in pressure between the depths $h_3$ and $h_4$ as being equal to the expression $h_2 p_w$, wherein $p_w$ = the density of the indicator liquid 30. Thus:

$$h_4 p_g - h_3 p_g = h_2 p_w$$

or, $$h_4 - h_3 = h_2 p_w / p_g \tag{7}$$

Next, it is clear that:

$$h_7 = (h_4 - h_3) - h_2 \tag{8}$$

and substituting in that equation for the quantity $h_4 - h_3$ from the foregoing equation (7) we have $$h_7 = h_2 p_w / p_g - h_2 = h_2(p_w/p_g - 1) \tag{9}$$

Now, since $\Delta h = h_6 + h_7$, it may be rewritten by substitutions from equations (3) and (9) to be $$\Delta h = (d_2/d_1)^2 h_{2/2} + h_2(p_w/p_g - 1) = h_2[\tfrac{1}{2}(d_2/d_1)^2 + p_w/p_g - 1] \tag{10}$$

From this it can be seen that if the densities, i.e. $p_w$ and $p_g$ are substantially equal, the difference in liquid levels from the beginning to the end of a measurement time period, i.e. $\Delta h$, will be reflected at the levels of the indicator-liquid 30 surfaces as one half of h times the ratio of the inside diameter $d_2$ *divided by* $d_1$, squared. Or:

$$\Delta h = h_{2/2}(d_2/d_1)^2 \tag{11}$$

In other words, the change in level 12 of the liquid 11, will be small compared to the change in the level of the surfaces of the indicator liquid columns of liquid 30, in the U-tube legs 16 and 17. Thus, the latter is an amplification of the former, in accordance with a ratio that is mostly related to the inside cross-sectional areas of the larger and smaller columns when the density of the indicator liquid 30 is nearly the same as that of the body of liquid 11.

An instrument constructed in accordance with the invention, which may be employed for measuring change in the surface level of a fluid, is illustrated in FIG. 3. This includes the various elements which will be described in more detail below. The instrument will be immersed in a body of liquid 40 which is to have any change in surface level thereof measured.

There is a relatively small inside diameter U-tube 41 which has a pair of legs 44 and 45. The U-tube 41 contains a predetermined quantity of an indicator liquid 48 therein, which is immiscible with the liquid 40. In addition, the indicator liquid 48 will preferrably have a color added thereto for aiding observation of the surface levels thereof.

An instrument that was tested, employed as the indicator liquid 48, a mixture of methanol and 5% water, which was dyed slightly to make it distinguishable visually from the body of liquid 40 which was gasoline. Of course, the legs 44 and 45 of the U-tube portion 41, were transparent.

In the instrument illustrated in FIG. 3, a relatively large inside diameter tube 51 is connected to the top of the leg 45 of the U-tube 41. The large tube 51 is long enough to extend from above the maximum surface level of the body of liquid 40, during a measurement, to below the minimum surface level thereof.

There is a three-way valve 52 that is schematically indicated in FIGS. 4 and 5. This valve 52 has three ports 56, 57 and 58. These ports are connected to the legs 44 and 45 of the U-tube 41, as well as to the body of liquid 40, in the manner indicated by the schematic diagrams of FIGS. 4 and 5.

Valve 52 is located on the instrument so that the connections to U-tube legs 44 and 45 are above the maximum height of the surfaces of indicator liquid 48 therein. Also, it has at least three different positions, two of which are indicated by the schematic showings in FIGS. 4 and 5. One position is like that shown in FIG. 4 which connects the port 57 directly with common internal passages that are indicated schematically by three arrows 60. Consequently, the port 57 is connected to port 58 and port 56 together. Thus, in this position the leg 45 of the J-tube instrument is connected to the leg 44 and to body of liquid 40. Therefore the indicator liquid 48 will stabilize its surfaces at equal levels, so that the indicator liquid 48 has equal height columns in the legs 44 and 45.

It will be observed that the instrument also has a reservoir 61 that is connected into the leg 44 of the U-tube 41. This reservoir 61 is provided in order to contain any overflow of the indicator liquid 48, in case the response becomes too great.

Also, there is an elongated support member 62 which, has the tubes of the J-tube instrument attached in any convenient manner. It is for handling the instrument and to support it when a measurement is being taken.

There is an elongated handle 65 which connects to the three-way valve 52 and extends upward sufficiently to rise above the surface of the liquid 40 for manual manipulation of the valve.

It will be appreciated that a measurement procedure to detect a change in surface level of the liquid 40 will involve an instrument like that described above, and a step of immersing the J-tube instrument into the body of liquid 40. Then the instrument will be held at a fixed position to allow equalization of the columns of indicator—liquid 48 in the legs 44 and 45. This equalization will take place with the valve 52 in the position indicated by FIG. 4.

At the commencement of a measuring time period the valve 52 will be shifted to the position indicated in FIG. 5, and consequently the liquid column on the long side (tube 51 and leg 45) of the J-tube instrument will be isolated from the liquid 40. After a predetermined period of time, any change in the level of the body of liquid 40 will be reflected by the amplified change in levels of the surfaces of indicator liquid 48, in the manner indicated above. This change will take place while the valve 52 is in a position shown in FIG. 5.

Then, in order to take a reading of the indicator—fluid surface levels in the U-tube legs 44 and 45, the situation may be held at then existing conditions by shifting the valve 52 to a position (not illustrated) which will close both ports 57 and 58. This holds the liquid levels in legs 44 and 45 at the positions they had reached. Then the instrument may be raised bodily up out of the liquid 40 in order to take a reading of the difference in levels of the surfaces of indicator liquid 48.

It will be appreciated by any one skilled in the art that the same principles apply to a structure which may be employed as a sensitive manometer. Thus, with reference to FIG. 6 there is illustrated a U-tube structure 70. The bottom portion contains an indicator-liquid 73 which may be like the indicator liquid of the above described modifications.

The indicator liquid 73 is immiscible with the liquid columns 74 and 75 that are located above the upper surfaces of the indicator liquid 73. These liquid columns 74 and 75 are continued in small size portions 78 and 79 respectively, above the indicator liquid 73 in the U-tube 70. It will be appreciated from the description of the foregoing J-tube modification that the legs 78 and 79 and the bottom of the U-tube have a predetermined relatively small inside cross-sectional area.

Connected to the tops of the legs 78 and 79 there are a pair of extensions 80 and 81 respectively, and these are enlarged so that the inside cross-sectional areas are greater than that of the legs 78 and 79.

The liquid column 74 and 75 will be filled to an equal level at the surfaces thereof, when the indicator liquid 73 stands in balance with its upper surfaces at the same level. In order to ensure stability under such conditions, it is preferable for the indicator liquid 73 to have a slightly greater density than the liquid in the columns 74 and 75.

Since the instrument 70 is intended for use as a manometer, it will be usual to have the extensions 80 and 81 constructed with a reduction of the diametric size thereof at the top of each. This provides tubes or passages for application of gas pressures that are to be measured. It will be appreciated and can be shown, that in the manometer instrument according to FIG. 6, a difference in pressure applied to the two liquid columns 74 and 75, will produce an amplified difference in the surface heights of indicator liquid surfaces 73. The same principles as were explained above in connection with the other modifications of the invention are applicable. Such amplification will be at a ratio which is close to that of the cross-sectional areas of the larger and smaller portions of each of the two liquid columns making up the U-tube 70. This, of course, assumes that the density of the indicator liquid 73 is quite close to the same density as the liquid in columns 74 and 75 there above.

FIG. 7 illustrates a physcial embodiment of J-tube structure according to the invention, which is the equivalent of the U-tube element that is illustrated in the more conventional structures illustrated in the earlier figures. Thus, it will be appreciated by anyone skilled in the art that where the term U-tube is being used, throughout the application, it may take the physical form of a concentric U-tube such as that illustrated in FIG. 7. Consequently, the same reference numbers are used in FIG. 7 as those that were employed in connection with FIGS. 1 and 2, but with prime marks added.

In FIG. 7, the body of liquid 11' has a surface 12' that may vary in height as was indicated in regard to FIGS. 1 and 2. Also, the instrument includes a U-tube portion 15' that has a shorter leg 16' that is concentrically located inside of a longer leg 17'. This longer leg 17' is in the form of an annular space surrounding the other leg 16' and, as was the case in the more conventional structure U-tube elements of FIGS. 1 and 2, the cross-sectional area of the leg 16' is the same as the cross-sectional area of the annular leg 17'. The bottom of the U-tube has open liquid connection by the fact of the bottom end of the leg 16' being open. It will be observed that the indicator liquid 30' fills the bottom ends of the U-tube legs 16' and 17'. Also, as in the FIG. 1 showing, there is the larger cross-sectional area tube 20' that is long enough to extend up above the maximum level of surface 12' of the liquid 11'. The diameter of the tube 20' is indicated by the $d_1$ that is applied to an arrow 31' extending across the diameter of the tube 20'. In regard to the smaller cross-sectional area of the U-tube legs 16' and 17', it will be noted that the smaller diameter indicated by $d_2$ is indicated by the arrows 32' and it is the same cross-sectional area as that of the other U-tube leg 17' which is annular in shape.

In this modification, the valve structure may take various forms and is schematically indicated by a T-shaped passage through a rotor 84 which may be set to control flow of fluid through three ports or passages 87, 88 and 89. It will be noted that there is a housing 92 that surrounds and within which the rotor 84 is rotated. The port 87 has a short connecting walled passage or tube 93 that makes a connection from inside of the housing 92 to the outside of the U-tube leg 17'.

The port 88 is an opening or connection through the housing 92 which joins the top of the inner U-tube leg 16'. And, the port 89 is an opening in the housing 92 of the valve structure which permits free fluid access through the housing to any connecting passageway inside in the rotor 84, when in alignment. It, of course, is open for flow of fluids from the leg 17' of the U-tube into the passageways as determined by the rotor 84 of the valve.

It will be appreciated that the valve positions of the rotor 84 will be carried out in a similar manner as was described in connection with FIGS. 4 and 5 so that the valve position of rotor 84 that is illustrated in FIG. 7 is like that shown in FIG. 4 schematic. This connects all of the various fluids together so that the fluid levels of the indicator fluid 30' will stabilize at an equal height. Then, when a measurement is to be taken, the valve rotor 84 will be rotated 90° counter-clockwise and this will then connect the liquid body 11' directly to the leg 16' of the U-tube 15' to the exclusion of other connections. At the same time, the inside of the tube 20' is only connected to the leg 17' portion of the U-tube. This, then, is like the diagrammatic illustration of FIG. 5, in effect, and the explanations are comparable.

While particular embodiments of the invention have been described above in considerable detail in accordance with the applicable statutes, this is not to be taken as in any way limiting the invention but merely as being descriptive thereof.

I claim:

1. Senstive J-tube instrument for measuring change in the surface level of a fluid in an underground tank or the like, comprising
   a U-tube portion containing an indicator fluid therein,
   said U-tube portion having a predetermined inside cross-sectional area,
   one leg of said U-tube portion being connected to a larger inside cross-sectional area tube to form the taller leg of said J-tube,
   said larger inside cross-sectional area tube being long enough to extend from above the maximum surface level of said fluid being measured to below the minimum surface level thereof, and
   valve means for connecting each of said U-tube portion legs with said fluid being measured and for isolating said taller leg,
   said valve means being connected above the tops of said indicator fluid.

2. Measuring instrument according to claim 1, wherein
   said indicator fluid is immiscible with said fluid the change in surface level of which is to be measured.

3. Measuring instrument according to claim 2, wherein
   said indicator fluid has a density approximately the same but heavier than said fluid to be measured.

4. Measuring instrument according to claim 3, wherein
   said indicator fluid includes a coloring agent for visually distinguishing from said fluid to be measured.

5. Measuring instrument according to claim 4, wherein
   said valve means comprises a three-way valve.

6. Measuring instrument according to claim 5, further comprising
   a reservoir connected to the other leg of said U-tube portion at a location above the maximum expected height of said indicator fluid in order to contain any overflow without loss of indicator fluid.

7. Measuring instrument according to claim 6, further comprising
   an elongated support for suspending said instrument in said fluid to be measured.

8. Measuring instrument according to claim 7, further comprising
   elongated means for actuating said three-way valve from a location above the surface of said fluid to be measured.

9. Sensitive J-tube device for measuring change in the surface level of a fluid, comprising
   a relatively small inside diameter U-tube containing a predetermined quanity of a colored indicator-fluid that is immiscible with said fluid the surface level of which is to be measured,
   said indicator-fluid having a density approximately the same but heavier than said fluid being measured,
   a relatively large inside diameter tube connected to one leg of said U-tube and forming the taller leg of said J-tube,
   said large tube being long enough to extend from above the maximum surface level of said fluid being measured to below the minimum surface level thereof,
   a three-way valve having three ports for connection to each of the legs of said U-tube and to the body of said fluid being measured,
   means for connecting said U-tube leg ports to said U-tube at a location that is above the maximum height of said indicator-fluid therein,
   said three-way valve having at least three positions one for connecting all three of said ports together and one for connecting only the shorter leg of said J-tube to the body of said fluid being measured and one for closing said U-tube leg ports,
   a reservoir connected into the shorter leg of said J-tube at a location above the maximum expected height of said indicator-fluid in order to contain any overflow without loss of indicator-fluid,
   an elongated support for holding said J-tube device in a fixed position when a measurement is being taken, and
   an elongated handle for actuating said three-way valve from a location above the surface of said fluid being measured.

10. Method of measuring a change in surface level of a fluid, comprising the steps of
    taking a relatively small inside cross-sectional area U-tube having an indicator-fluid therein,
    connecting a larger inside cross-sectional area tube to one leg of said U-tube,
    immersing said tubes into said fluid with said larger area tube extending above said surface level, connecting both legs of said U-tube with said fluid at a location on said tubes which is above the maximum height of said indicator-fluid therein,
    said connection being made while said tubes are immersed,
    disconnecting said one leg from said fluid to isolate said leg and said larger area tube from said fluid at the beginning of a measuring time period, and
    determining the difference in height of the tops of said indicator-fluid levels in said U-tube at the end of said measuring time period whereby the change in surface level of said fluid is magnified.

11. Method of magnifying the measurement of a change in surface level of a first fluid by employing a U-tube containing a second fluid which is immiscible with said first fluid, comprising the steps of connecting a relatively large cross-section area tube to one leg of said U-tube at a location that is higher than a predetermined maximum level of rise of said second fluid in one of the legs of said U-tube, connecting both legs of said U-tube into communication with said first fluid at a location above said maximum level prior to the commencement of a measurement time period, immersing said U-tube and said large area tube in said first fluid to equalize the level of said first fluid inside of said large area tube with that outside and equalize the levels of said second fluid in said U-tube legs, isolating said one leg and the large cross-section area tube from said first fluid at said commencement of said measurement time period, and determining the difference in fluid levels of said second fluid in said U-tube legs at the termination of said measurement time period.

* * * * *